US010607264B2

(12) United States Patent
Lin et al.

(10) Patent No.: US 10,607,264 B2
(45) Date of Patent: Mar. 31, 2020

(54) SYSTEMS AND METHODS FOR VIRTUAL APPLICATION OF COSMETIC EFFECTS TO PHOTO ALBUMS AND PRODUCT PROMOTION

(71) Applicant: Perfect Corp., New Taipei (TW)

(72) Inventors: Yi-Wei Lin, New Taipei (TW); Horng Wu, Taipei (TW); Ying-Yin Lin, Changhua (TW)

(73) Assignee: PERFECT CORP., New Taipei (TW)

( * ) Notice: Subject to any disclaimer, the term of this patent is extended or adjusted under 35 U.S.C. 154(b) by 0 days.

(21) Appl. No.: 15/980,484

(22) Filed: May 15, 2018

(65) Prior Publication Data

US 2019/0244260 A1    Aug. 8, 2019

Related U.S. Application Data

(60) Provisional application No. 62/625,400, filed on Feb. 2, 2018.

(51) Int. Cl.
*G06Q 30/02* (2012.01)
*G06K 9/00* (2006.01)
(Continued)

(52) U.S. Cl.
CPC ......... *G06Q 30/0282* (2013.01); *G06F 16/54* (2019.01); *G06F 21/31* (2013.01);
(Continued)

(58) Field of Classification Search
None
See application file for complete search history.

(56) References Cited

U.S. PATENT DOCUMENTS 5,659,625 A    8/1997    Marquardt
6,293,284 B1    9/2001    Rigg
(Continued)

FOREIGN PATENT DOCUMENTS

CN    104873197 A    9/2015
CN    106530014 A    3/2017
(Continued)

OTHER PUBLICATIONS

"My Skin Advisor!", http://feistyfoxdiaries.com/2016/01/my-skin-advisor/. Jan. 29, 2016.
(Continued)

*Primary Examiner* — Edward Martello
(74) *Attorney, Agent, or Firm* — McClure, Qualey & Rodack, LLP

(57) ABSTRACT

A computing device obtains and authenticates user credentials provided by a user at a client device. The computing device obtains a photo album of digital images and accesses profile data associated with the user credentials. A grouping of target images is extracted by the computing device from the plurality of digital images based on the profile data, each of the target images depicting a facial region of the user. The computing device retrieves at least one product recommendation for each target image based on the user profile and edits each of the target images based on the retrieved at least one product recommendation. The computing device causes a user interface to be displayed at the client device, the user interface displaying one or more of the edited target images, the user interface further displaying the retrieved at least product recommendation associated with the one or more edited target images.

18 Claims, 5 Drawing Sheets

(51) Int. Cl.
  *G06T 11/60* (2006.01)
  *G06F 16/54* (2019.01)
  *G06F 21/31* (2013.01)
  *H04L 29/06* (2006.01)

(52) U.S. Cl.
  CPC ..... *G06K 9/00221* (2013.01); *G06K 9/00228* (2013.01); *G06T 11/60* (2013.01); *G06K 9/00677* (2013.01); *G06T 2200/24* (2013.01); *H04L 63/083* (2013.01)

(56) References Cited

U.S. PATENT DOCUMENTS

| | | | |
|---|---|---|---|
| 7,634,103 | B2 | 12/2009 | Rubinstenn et al. |
| 8,855,974 | B2 | 10/2014 | Cho et al. |
| 9,542,595 | B2 | 1/2017 | Chhibber et al. |
| 9,603,437 | B2 | 3/2017 | Nguyen et al. |
| 9,760,935 | B2 | 9/2017 | Aarabi |
| 2005/0165706 | A1 | 7/2005 | Giacchetti |
| 2006/0178904 | A1 | 8/2006 | Aghassian et al. |
| 2007/0058858 | A1 | 3/2007 | Harville et al. |
| 2007/0236581 | A1* | 10/2007 | Uchiyama ......... H04N 1/00323 348/222.1 |
| 2008/0163344 | A1 | 7/2008 | Yang |
| 2009/0234716 | A1 | 9/2009 | Mallick et al. |
| 2012/0223956 | A1 | 9/2012 | Saito et al. |
| 2013/0111337 | A1 | 5/2013 | Deng et al. |
| 2015/0339757 | A1* | 11/2015 | Aarabi ................. G06Q 30/06 705/12 |
| 2015/0366328 | A1 | 12/2015 | Tamura et al. |
| 2016/0328632 | A1 | 11/2016 | Choe et al. |
| 2017/0256084 | A1 | 9/2017 | Iglehart et al. |

FOREIGN PATENT DOCUMENTS

| | | |
|---|---|---|
| JP | 2004280395 A | 10/2004 |
| JP | 2005148797 A | 6/2005 |
| JP | 4128680 B2 | 7/2008 |
| JP | 2015197710 A | 11/2015 |
| WO | 2011/085727 A1 | 7/2011 |

OTHER PUBLICATIONS

Mary Kay Virtual Makeover, https://www.marykay.com/en-us/tips-and-trends/makeover-and-beauty-tools/virtual-makeover (printed May 15, 2018).

Filipe Morgado Simoes de Campos and Carlos H. Morimoto, "Virtual Makeup: Foundation, Eye Shadow and Lipstick Simulation" 2014 XVI Symposium on Virtual and Augmented Reality (SVR). May 12-15, 2014.

Sephora Virtual Artist, https://sephoravirtualartist.com/landing_5.0.php?country=US&lang=en&x=&skintone=&currentModel= (printed May 15, 2018).

Taleb Alashkar et al., "Examples—Rules Guided Deep Neural Network for Makeup Recommendation", Proceedings of the Thirty-First AAAI Conference on Artificial Inteligence (AAAI-17). Feb. 2, 2017.

European search report issued is corresponding European patent application No. 18202876.1 dated Feb. 25, 2019.

* cited by examiner

SYSTEMS AND METHODS FOR VIRTUAL APPLICATION OF COSMETIC EFFECTS TO PHOTO ALBUMS AND PRODUCT PROMOTION

CROSS-REFERENCE TO RELATED APPLICATION

This application claims priority to, and the benefit of, U.S. Provisional Patent Application entitled, "Automatically apply makeup on photos in cloud album and recommend related products," having Ser. No. 62/625,400, filed on Feb. 2, 2018, which is incorporated by reference in its entirety.

TECHNICAL FIELD

The present disclosure generally relates to media editing and more particularly, to systems and methods for performing virtual application of cosmetics to photo albums and for promoting cosmetic products.

BACKGROUND

With the proliferation of smartphones, tablets, and other display devices, people have the ability to access digital content virtually any time where application programs have become popular on smartphones and other portable display devices for viewing media content. Although targeted advertising is commonly implemented on the Internet, there is still a need for an improved platform for promoting products to individuals.

SUMMARY

In accordance with one embodiment, a computing device obtains and authenticates user credentials provided by a user at a client device. The computing device obtains a photo album of digital images and accesses profile data associated with the user credentials. A grouping of target images is extracted by the computing device from the plurality of digital images based on the profile data, each of the target images depicting a facial region of the user. The computing device retrieves at least one product recommendation for each target image based on the profile data and edits each of the target images based on the retrieved at least one product recommendation. The computing device causes a user interface to be displayed at the client device, the user interface displaying one or more of the edited target images, the user interface further displaying the retrieved at least product recommendation associated with the one or more edited target images.

Another embodiment is a system that comprises a memory storing instructions and a processor coupled to the memory. The processor is configured by the instructions to obtain and authenticate user credentials provided by a user at a client device. The processor is further configured to obtain a photo album comprising a plurality of digital images and access profile data associated with the user credentials. The processor is further configured to extract a grouping of target images from the plurality of digital images based on the profile data and retrieve at least one product recommendation for each target image based on the profile data, wherein each of the target images in the grouping depicts a facial region of the user. The processor is further configured to edit each of the target images based on the retrieved at least one product recommendation. The processor is further configured to cause a user interface to be displayed at the client device, the user interface displaying one or more of the edited target images, the user interface further displaying the retrieved at least product recommendation associated with the one or more edited target images.

Another embodiment is a non-transitory computer-readable storage medium storing instructions to be implemented by a computing device having a processor, wherein the instructions, when executed by the processor, cause the computing device to obtain and authenticate user credentials provided by a user at a client device. The processor is further configured to obtain a photo album comprising a plurality of digital images and access profile data associated with the user credentials. The processor is further configured to extract a grouping of target images from the plurality of digital images based on the profile data and retrieve at least one product recommendation for each target image based on the profile data, wherein each of the target images in the grouping depicts a facial region of the user. The processor is further configured to edit each of the target images based on the retrieved at least one product recommendation. The processor is further configured to cause a user interface to be displayed at the client device, the user interface displaying one or more of the edited target images, the user interface further displaying the retrieved at least product recommendation associated with the one or more edited target images.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Figure 1:
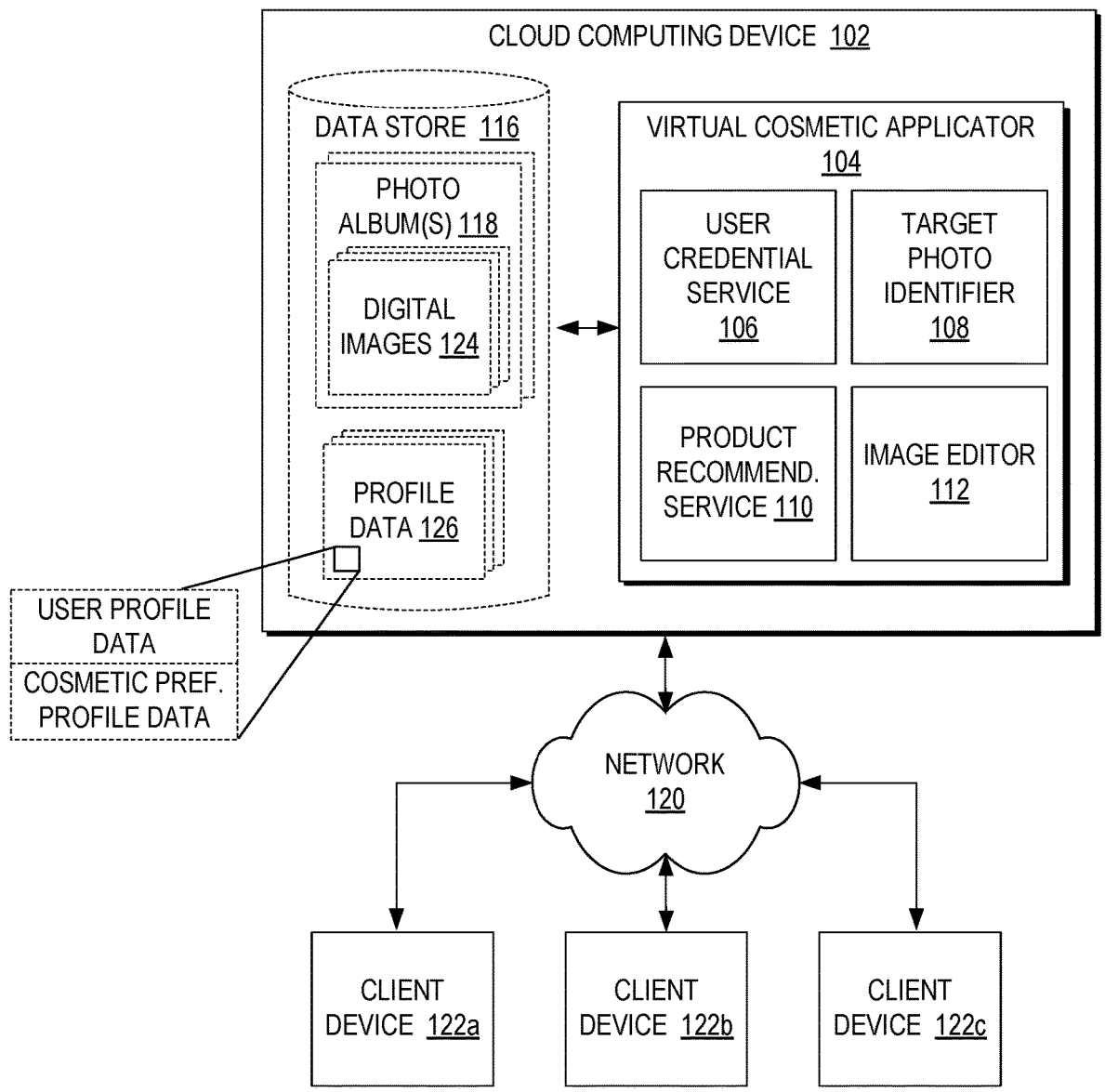
FIG. 1 is a block diagram of a cloud computing device for virtual application of cosmetic effects and product promotion in accordance with various embodiments of the present disclosure.

Although targeted advertising is commonly implemented, for example, on the Internet, there is still a need for an improved platform for promoting products to individuals. Various embodiments are directed to an improved platform for performing virtual application of cosmetic products to digital images in a cloud album and for recommending cosmetic products to a user. A description of a system for implementing virtual application of cosmetic effects and for promoting products is now described followed by a discussion of the operation of the components within the system. FIG. 1 is a block diagram of a cloud computing device 102 in which the techniques for virtual application of cosmetic effects and product promotion disclosed herein may be implemented. The cloud computing device 102 may comprise a server computer, a cloud-based computing device, or any other system providing cloud computing capability. Alternatively, the cloud computing device 102 may employ a plurality of computing devices that can be arranged, for example, in one or more server banks, computer banks or other arrangements. Such computing devices can be located in a single installation or can be distributed among different geographical locations.

The cloud computing device 102 is coupled to a network 120 such as, for example, the Internet, intranets, extranets, wide area networks (WANs), local area networks (LANs), wired networks, wireless networks, or other suitable networks, etc., or any combination of two or more such networks. Through the network, client devices 122a, 122b, 122c are communicatively coupled to the cloud computing device 102 for uploading and accessing digital images 124 in photo albums 118 stored in a data store 116 maintained by the cloud computing device 102. As one of ordinary skill will appreciate, the digital images 124 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

Alternatively, the digital images 124 may be derived from a still image of a video encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

A virtual cosmetic applicator 104 executes on a processor of the cloud computing device 102 and includes a user credential service 106, a target photo identifier 108, a product recommendation service 110, and an image editor 112. The user credential service 106 is configured to obtain and authenticate user credentials transmitted by a user at a client device 122 to access, for example, photo albums 118 previously uploaded by the user. Upon receiving user credentials from a user, the user credential service 106 accesses profile data 126 in the data store 116 to authenticate the user credentials.

If the user credentials are authenticated by the user credential service 106, the target photo identifier 108 is configured to obtain a photo album 118 comprising a plurality of digital images 124. The profile data 126 accessed by the user credential service 106 may include general information about the user such as user account information (e.g., login and password data), the user's age, the user's location, friends/contacts that have been granted access to the user's photo album 118, and so on. The profile data 126 may also include cosmetic preference profile data, which specifies the user's preferences with respect to cosmetic makeup results, cosmetic products for various facial features, data relating to past purchases of cosmetic products, and so on.

The target photo identifier 108 generates a grouping of target images from the plurality of digital images 124 based on the profile data. One can appreciate that the content in the digital images 124 of the photo album 118 can vary widely and may include, for example, photos of scenery, photos of other individuals, and so on. For some embodiments, the grouping of target images comprises digital images 124 that specifically depict a facial region of the user associated with the profile data.

The product recommendation service 110 is configured to retrieve at least one product recommendation for each target image based on the profile data. For example, based on the user's age specified in the profile data and based on the past purchase of a particular cosmetic product specified in the cosmetic preference profile data, the product recommendation service 110 may retrieve a particular brand of lipstick to recommend to the user.

The image editor 112 is configured to edit each of the target images based on the retrieved product recommendation. As one example, image editor 112 may perform virtual application of a particular brand of lipstick on some or all of the target images, where this can depend on attributes of the target images. To further illustrate, the image editor 112 may perform virtual application of the particular brand of lipstick on target images that depict the user in an outdoor setting, whereas the image editor 112 may perform virtual application of the particular brand of eye shadow on target images that depict the user in an indoor setting. In this regard, the image editor 112 may be configured to edit target images based on profile data and based on attributes of each target image. The image editor 112 is further configured to cause a user interface to be displayed at the client device 122, where the user interface displays one or more of the edited target images. The user interface further displays the retrieved product recommendation (e.g., lipstick) associated with the one or more edited target images.

Figure 2:
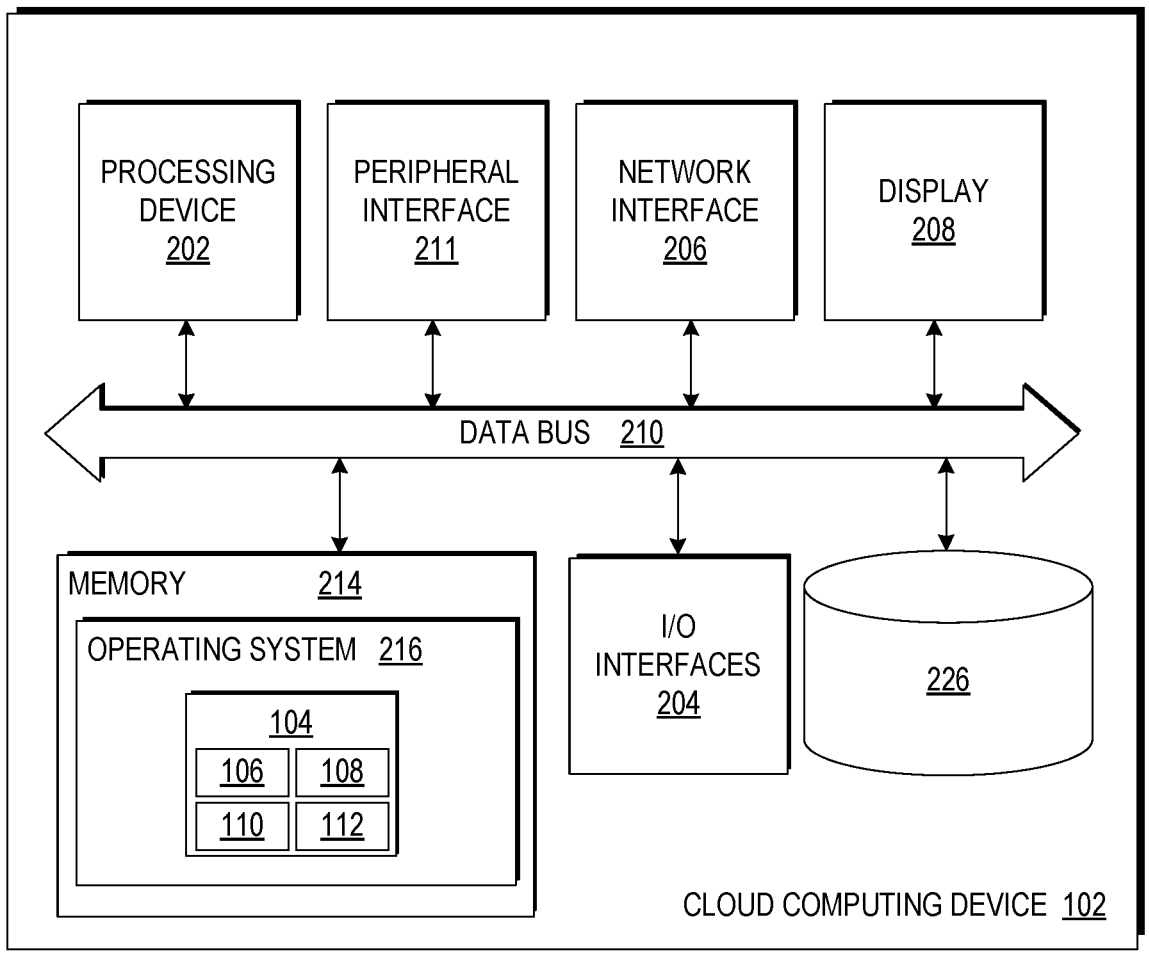
FIG. 2 is a schematic diagram of the cloud computing device of FIG. 1 in accordance with various embodiments of the present disclosure.

FIG. 2 illustrates a schematic block diagram of the cloud computing device 102 in FIG. 1. The cloud computing device 102 may be embodied in any one of a wide variety of wired and/or wireless computing devices, such as a server computer or any other system providing computing capability. As discussed above, the cloud computing device 102 may employ a plurality of computing devices that can be arranged, for example, in one or more server banks, computer banks or other arrangements. Such computing devices can be located in a single installation or can be distributed among different geographical locations.

As shown in FIG. 2, the cloud computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the cloud computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the cloud computing device 102 depicted in FIG. 1. In accordance with such embodiments, the components are stored in memory 214 and executed by the processing device 202, thereby causing the processing device 202 to perform the operations/functions for implementing the features disclosed herein. One of ordinary skill in the art will appreciate that the memory 214 can, and typically will, comprise other components which have been omitted for purposes of brevity. For some embodiments, the components in the cloud computing device 102 may be implemented by hardware and/or software.

Input/output interfaces 204 provide any number of interfaces for the input and output of data. For example, where the cloud computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
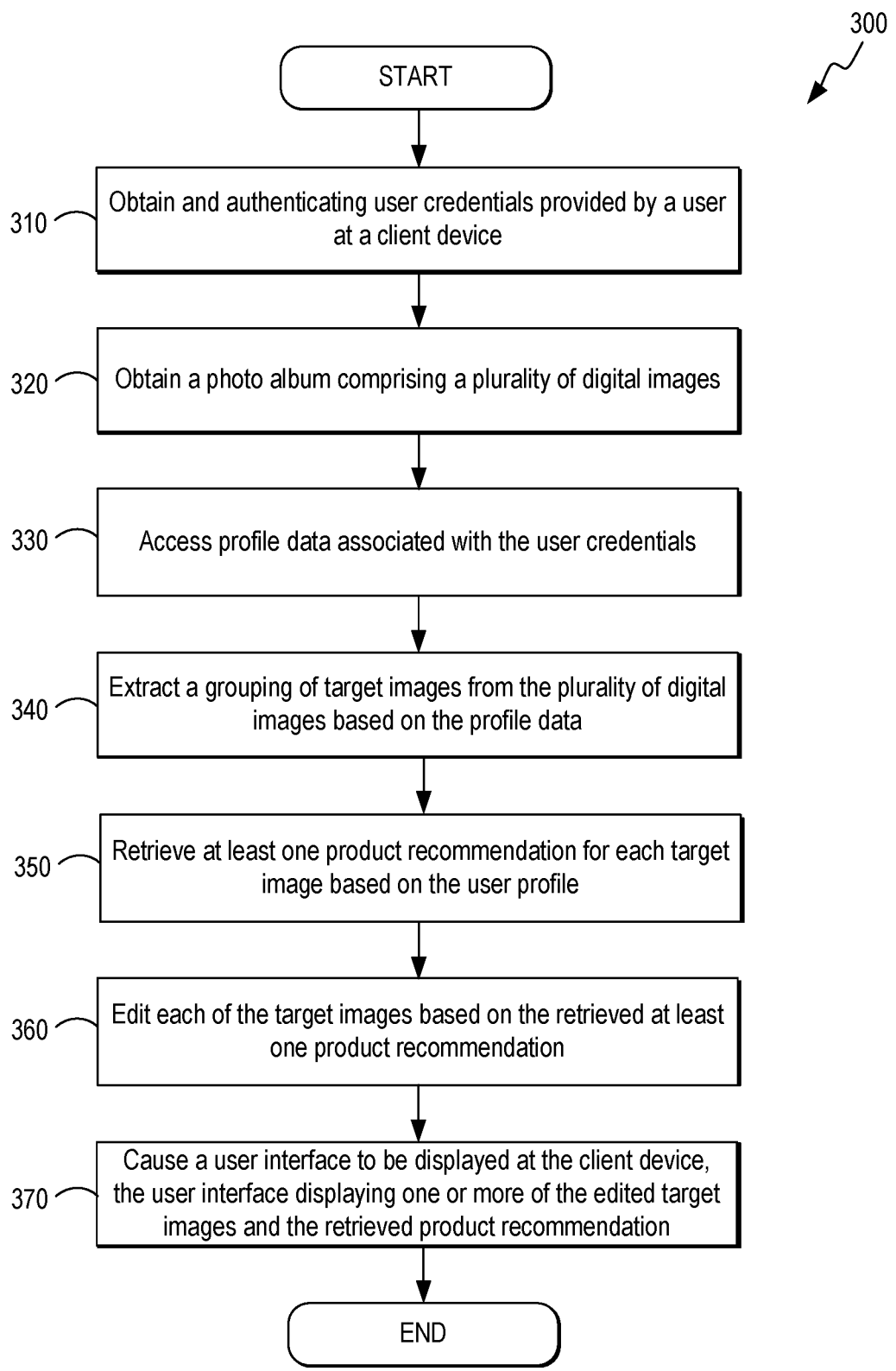
FIG. 3 is a top-level flowchart illustrating examples of functionality implemented as portions of the cloud computing device of FIG. 1 for virtual application of cosmetic effects and product promotion according to various embodiments of the present disclosure.

Reference is made to FIG. 3, which is a flowchart 300 in accordance with various embodiments for virtual application of cosmetic effects and product promotion performed by the cloud computing device 102 of FIG. 1. It is understood that the flowchart 300 of FIG. 3 provides merely an example of the different types of functional arrangements that may be employed to implement the operation of the various components of the cloud computing device 102. As an alternative, the flowchart 300 of FIG. 3 may be viewed as depicting an example of steps of a method implemented in the cloud computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the cloud computing device 102 obtains and authenticates user credentials provided by a user at a client device 122. In block 320, the cloud computing device 102 obtains a photo album comprising a plurality of digital images. In block 330, the cloud computing device 102 accesses profile data 126 (FIG. 1) associated with the user credentials. For some embodiments, accessing profile data associated with the user credentials comprises accessing a user profile comprising personal data associated with the user and a cosmetic preference profile specifying one or more cosmetic effects selected by the user.

For some embodiments, each cosmetic preference profile is associated with an image that depicts one or more cosmetic effects specified in the cosmetic preference profile. Such cosmetic effects may be ones previously applied by the user. In this regard, the image functions as a reference image that represents one or more cosmetic effects preferred by the user. For some embodiments, the cloud computing device 102 may be configured to analyze the reference image and identify the cosmetic effects previously applied by the user to identify cosmetic effects that are preferred by the user. The cloud computing device 102 may then utilize this information in providing product recommendations to the user. For some embodiments, the image associated with the cosmetic preference profile is uploaded to the cloud computing device. In block 340, the cloud computing device 102 extracts a grouping of target images from the plurality of digital images based on the profile data. For some embodiments, the grouping of target images comprises digital images depicting a facial region of the user of the client device 122.

In block 350, the cloud computing device 102 retrieves at least one product recommendation for each target image based on the user profile. For some embodiments, the cloud computing device 102 retrieves at least one product recommendation for each target image based on the profile data 126 by performing the following steps for each target image. The cloud computing device 102 accesses Exchangeable Image File Format (EXIF) data and obtains location data for each target image. The cloud computing device 102 determines a face color of a facial region of the user. The cloud computing device 102 determines an age of the user based on the user profile. The cloud computing device 102 determines cosmetic preferences based on the cosmetic preference profile.

The cloud computing device 102 then retrieves the at least one product recommendation for each target image based on at least one of the location data, the face color, the age of the user, and the cosmetic preferences, or combination thereof. For some embodiments, this involves assigning weight values to each of the location data, the face color, the age of the user, and the cosmetic preferences, where the cloud computing device 102 retrieves the at least one product recommendation for each target image based on a weighted combination of the location data, the face color, the age of the user, and the cosmetic preferences.

For some embodiments, the cloud computing device 102 retrieves at least one product recommendation for each target image based on the profile data by identifying a different user with overlapping profile data and retrieving the at least one product recommendation for each target image based on at least one product recommendation previously selected and applied by the different user. To further illustrate, reference is made back to FIG. 1. In some instances, the user credential service 106 may determine that there are similarities between the profile data of a current user and the profile data of a second user. For example, the user credential service 106 may examine the user profile data and determine that a current user and a second user are the same age and/or that the current user and the second user live in the same city (i.e., location). The user credential service 106 may then examine the cosmetic preference profile data of the second user and identify cosmetic products of interest previously specified by the second user. Based on this information, the product recommendation service 110 may then display the same cosmetic products as a recommendation to the current user.

In block 360, the cloud computing device 102 edits each of the target images based on the retrieved at least one product recommendation. For some embodiments, editing each of the target images comprises performing virtual application of a cosmetic product corresponding to at least one retrieved product recommendation onto the facial region of the user.

In block 370, the cloud computing device 102 causes a user interface to be displayed at the client device, the user interface displaying one or more of the edited target images, the user interface further displaying the retrieved at least product recommendation associated with the one or more edited target images. Thereafter, the process in FIG. 3 ends.

Figure 4:
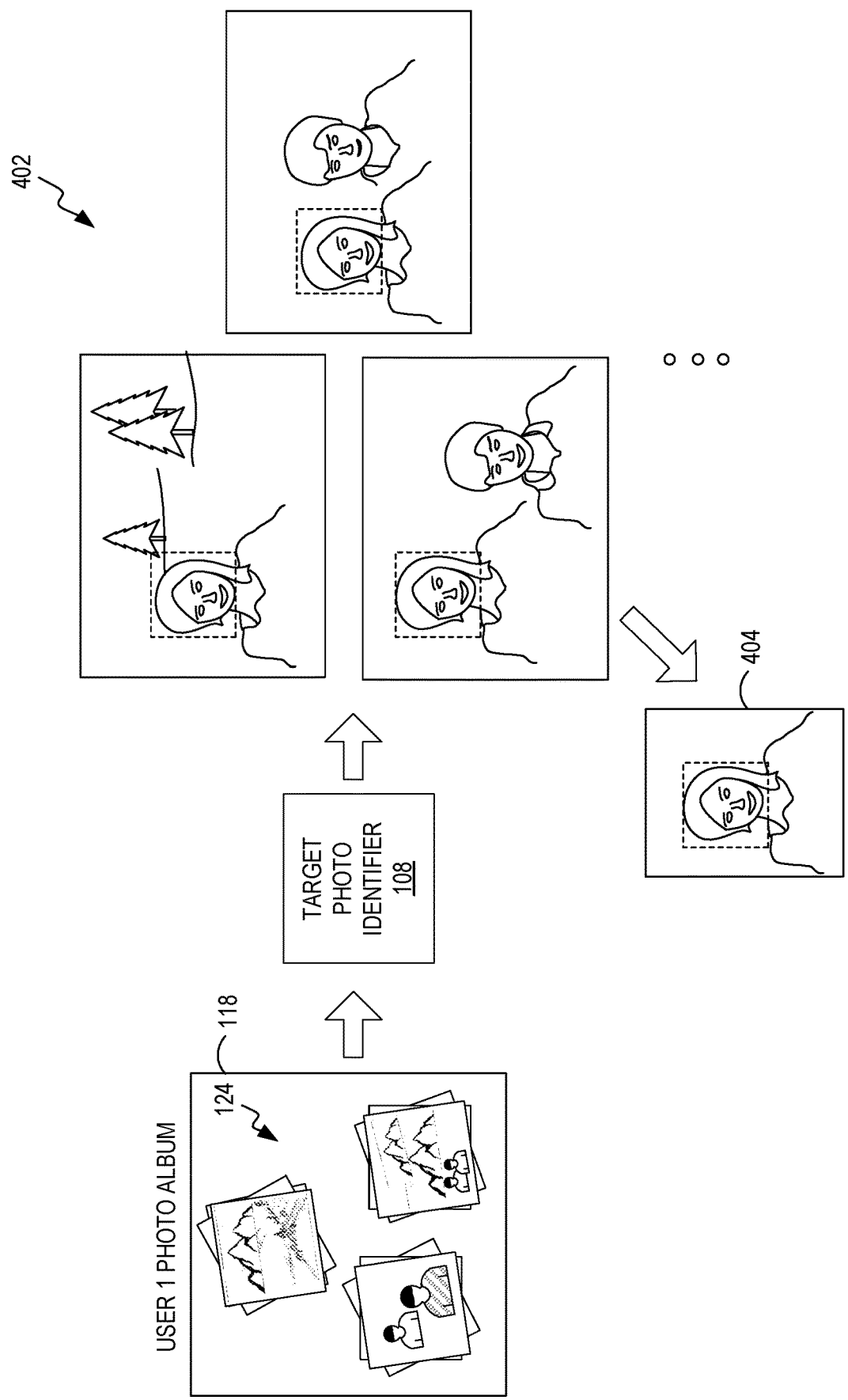
FIG. 4 illustrates a grouping of target images extracted from a photo album for purposes of product promotion by the cloud computing device in FIG. 1 according to various embodiments of the present disclosure.

Having described the basic framework of a system for virtual application of cosmetic effects and product promotion, reference is made to the following figures, which illustrate various features according to various embodiments. FIG. 4 illustrates a grouping of target images extracted from a photo album by the cloud computing device 102 in FIG. 1 for purposes of product promotion according to various embodiments. The target photo identifier 108 in the cloud computing device 102 accesses a photo album 118 of a user associated with the user credentials submitted by the user at a client device 122.

In the example shown, the target photo identifier 108 performs facial recognition and generates a grouping of target images 402 from the digital images 124 in the photo album 118. As discussed above, the content in the digital images 124 of the photo album 118 may vary widely and may include, for example, photos of scenery, photos of other individuals, and so on. As shown, the target photo identifier 108 extracts digital images 124 that specifically depict a facial region of the user associated with the user credentials. In some embodiments, the target photo identifier 108 may be further configured to modify target images 402 that depict the user and other individuals and generate cropped photos 404 such that only an image of the user remains.

Figure 5:
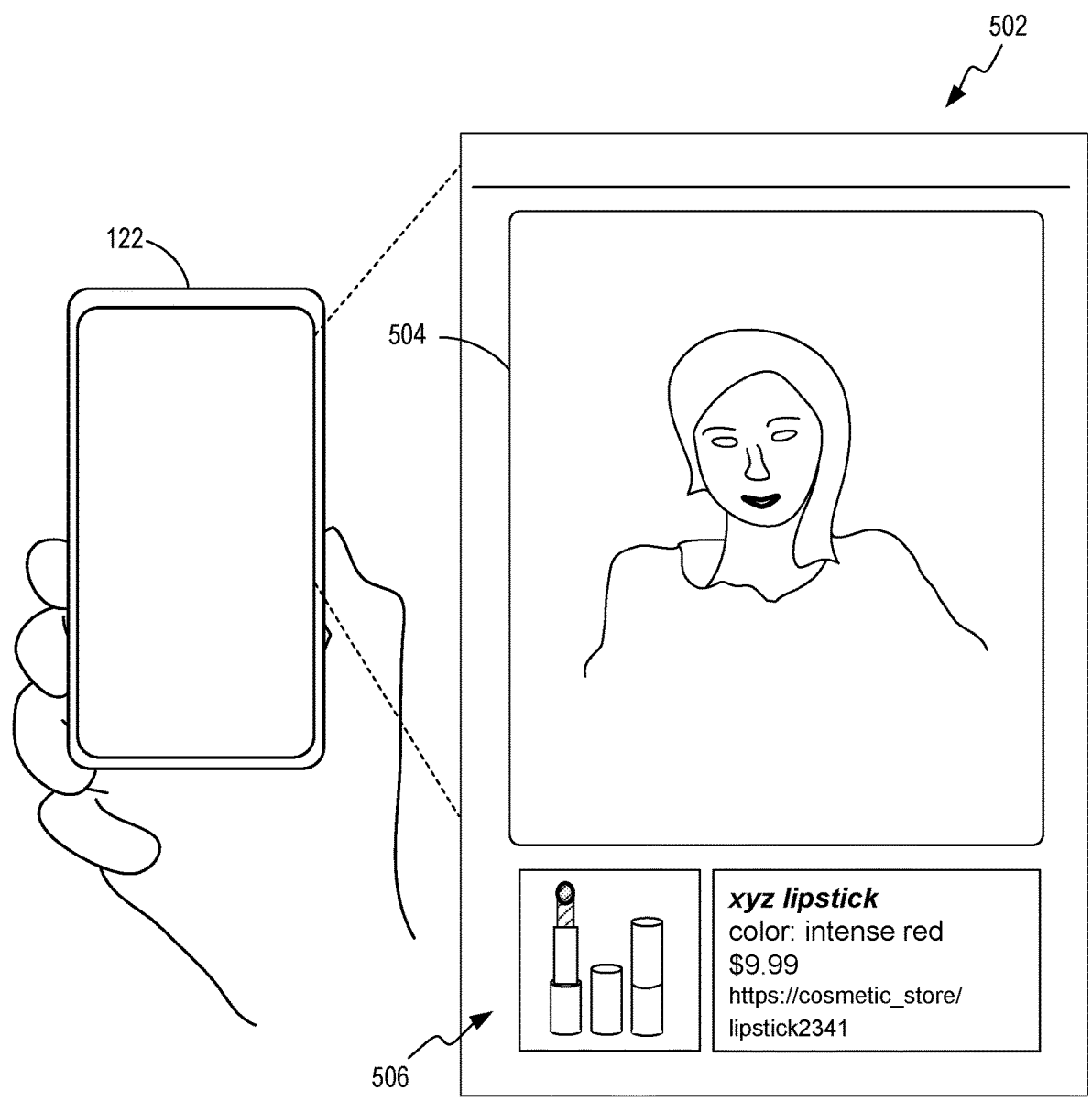
FIG. 5 illustrates an example user interface provided on a display of a client device in FIG. 1 for promoting products according to various embodiments of the present disclosure.

FIG. 5 illustrates an example user interface 502 provided on a display of a client device 122 in FIG. 1 for promoting products according to various embodiments of the present disclosure. The client device 122 may be embodied as a smartphone, a tablet computing device, and so on. As shown, the user interface 502 includes a preview window 504 that depicts the facial region of the user. The image editor 112 (FIG. 1) performs virtual application of one or more cosmetic effects based on cosmetic products retrieved by the product recommendation service 110 (FIG. 1).

In the example shown, the user interface 502 displays information 506 for the cosmetic product (e.g., lipstick) applied on the facial region of the user. The information 506 displayed to the user may include, but is not limited to, product descriptors/identifiers (e.g., brand name, product name, product image), product specifications (e.g., color, packaging, texture), purchasing information (e.g., a Uniform Resource Locator (URL) for an online retailer selling the particular product), and so on.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a cloud computing device, comprising:
    obtaining and authenticating user credentials provided by a user at a client device;
    obtaining a photo album comprising a plurality of digital images;
    accessing profile data associated with the user credentials, wherein the profile data comprises at least one of: age, location, or selected brand, wherein accessing the profile data associated with the user credentials comprises accessing a cosmetic preference profile specifying one or more cosmetic effects selected by the user, wherein each cosmetic preference profile is associated with a reference image depicting one or more cosmetic effects specified in the cosmetic preference profile, and wherein the image associated with the cosmetic preference profile is uploaded to the cloud computing device;
    extracting a grouping of target images from the plurality of digital images based on the profile data, wherein each of the target images in the grouping depicts a facial region of the user;
    retrieving at least one product recommendation for each target image based on the profile data, wherein retrieving the at least one product recommendation for each target image based on the profile data comprises:
        identifying a different user with overlapping profile data; and
        retrieving the at least one product recommendation for each target image based on the profile data of the different user specifying at least one product previously selected and applied by the different user;
    editing each of the target images based on the retrieved at least one product recommendation; and
    causing a user interface to be displayed at the client device, the user interface displaying one or more of the edited target images, the user interface further displaying the retrieved at least product recommendation associated with the one or more edited target images.

2. The method of claim 1, wherein editing each of the target images comprises performing virtual application of a cosmetic product corresponding to at least one retrieved product recommendation onto the facial region of the user.

3. The method of claim 1, wherein accessing the profile data associated with the user credentials further comprises accessing a user profile comprising personal data associated with the user.

4. The method of claim 3, wherein the one or more cosmetic effects depicted in the reference image were previously applied by the user.

5. The method of claim 3, wherein retrieving at least one product recommendation for each target image based on the profile data comprises:

for each target image:
    accessing Exchangeable Image File Format (EXIF) data and obtaining location data for each target image;
    determining a face color of a facial region of the user;
    determining an age of the user based on the user profile; and
    determining cosmetic preferences based on the cosmetic preference profile; and
    retrieving the at least one product recommendation for each target image based on at least one of: the location data, the face color, the age of the user, and the cosmetic preferences.

6. The method of claim 5, wherein retrieving the at least one product recommendation for each target image based on at least one of: the location data, the face color, the age of the user, and the cosmetic preferences comprises:
    assigning weight values to each of the location data, the face color, the age of the user, and the cosmetic preferences; and
    retrieving the at least one product recommendation for each target image based on a weighted combination of the location data, the face color, the age of the user, and the cosmetic preferences.

7. A system, comprising:
    a memory storing instructions;
    a processor coupled to the memory and configured by the instructions to at least:
        obtain and authenticate user credentials provided by a user at a client device;
        obtain a photo album comprising a plurality of digital images;
        access profile data associated with the user credentials, wherein the profile data comprises at least one of: age, location, or selected brand, wherein accessing the profile data associated with the user credentials comprises accessing a cosmetic preference profile specifying one or more cosmetic effects selected by the user, wherein each cosmetic preference profile is associated with a reference image depicting one or more cosmetic effects specified in the cosmetic preference profile, and wherein the image associated with the cosmetic preference profile is uploaded to the cloud computing device;
        extract a grouping of target images from the plurality of digital images based on the profile data, wherein each of the target images in the grouping depicts a facial region of the user;
        retrieve at least one product recommendation for each target image based on the profile data, wherein retrieving the at least one product recommendation for each target image based on the profile data comprises:
            identifying a different user with overlapping profile data; and
            retrieving the at least one product recommendation for each target image based on the profile data of the different user specifying at least one product previously selected and applied by the different user;
        edit each of the target images based on the retrieved at least one product recommendation; and
        cause a user interface to be displayed at the client device, the user interface displaying one or more of the edited target images, the user interface further displaying the retrieved at least product recommendation associated with the one or more edited target images.

8. The system of claim 7, wherein the processor edits each of the target images by performing virtual application of a cosmetic product corresponding to at least one retrieved product recommendation onto the facial region of the user.

9. The system of claim 7, wherein the processor accesses the profile data associated with the user credentials by further assessing a user profile comprising personal data associated with the user.

10. The system of claim 9, wherein the one or more cosmetic effects depicted in the reference image were previously applied by the user.

11. The system of claim 9, wherein the processor retrieves at least one product recommendation for each target image based on the profile data by performing the steps of:
    for each target image:
        accessing Exchangeable Image File Format (EXIF) data and obtaining location data for each target image;
        determining a face color of a facial region of the user;
        determining an age of the user based on the user profile; and
        determining cosmetic preferences based on the cosmetic preference profile; and
    retrieving the at least one product recommendation for each target image based on at least one of: the location data, the face color, the age of the user, and the cosmetic preferences.

12. The system of claim 11, wherein the processor retrieves the at least one product recommendation for each target image based on at least one of: the location data, the face color, the age of the user, and the cosmetic preferences by performing the steps of:
    assigning weight values to each of the location data, the face color, the age of the user, and the cosmetic preferences; and
    retrieving the at least one product recommendation for each target image based on a weighted combination of the location data, the face color, the age of the user, and the cosmetic preferences.

13. A non-transitory computer-readable storage medium storing instructions to be implemented by a computing device having a processor, wherein the instructions, when executed by the processor, cause the computing device to at least:
    obtain and authenticate user credentials provided by a user at a client device;
    obtain a photo album comprising a plurality of digital images;
    access profile data associated with the user credentials, wherein the profile data comprises at least one of: age, location, or selected brand, wherein accessing the profile data associated with the user credentials comprises accessing a cosmetic preference profile specifying one or more cosmetic effects selected by the user, wherein each cosmetic preference profile is associated with a reference image depicting one or more cosmetic effects specified in the cosmetic preference profile, and wherein the image associated with the cosmetic preference profile is uploaded to the cloud computing device;
    extract a grouping of target images from the plurality of digital images based on the profile data, wherein each of the target images in the grouping depicts a facial region of the user;

retrieve at least one product recommendation for each target image based on the profile data, wherein retrieving the at least one product recommendation for each target image based on the profile data comprises:
identifying a different user with overlapping profile data; and
retrieving the at least one product recommendation for each target image based on the profile data of the different user specifying at least one product previously selected and applied by the different user;
edit each of the target images based on the retrieved at least one product recommendation; and
cause a user interface to be displayed at the client device, the user interface displaying one or more of the edited target images, the user interface further displaying the retrieved at least product recommendation associated with the one or more edited target images.

14. The non-transitory computer-readable storage medium of claim 13, wherein the processor edits each of the target images by performing virtual application of a cosmetic product corresponding to at least one retrieved product recommendation onto the facial region of the user.

15. The non-transitory computer-readable storage medium of claim 13, wherein the processor accesses the profile data associated with the user credentials by further assessing a user profile comprising personal data associated with the user.

16. The non-transitory computer-readable storage medium of claim 15, wherein the one or more cosmetic effects depicted in the reference image were previously applied by the user.

17. The non-transitory computer-readable storage medium of claim 15, wherein the processor retrieves at least one product recommendation for each target image based on the profile data by performing the steps of:
for each target image:
accessing Exchangeable Image File Format (EXIF) data and obtaining location data for each target image;
determining a face color of a facial region of the user;
determining an age of the user based on the user profile; and
determining cosmetic preferences based on the cosmetic preference profile; and
retrieving the at least one product recommendation for each target image based on at least one of: the location data, the face color, the age of the user, and the cosmetic preferences.

18. The non-transitory computer-readable storage medium of claim 17, wherein the processor retrieves the at least one product recommendation for each target image based on at least one of: the location data, the face color, the age of the user, and the cosmetic preferences by performing the steps of:
assigning weight values to each of the location data, the face color, the age of the user, and the cosmetic preferences; and
retrieving the at least one product recommendation for each target image based on a weighted combination of the location data, the face color, the age of the user, and the cosmetic preferences.

* * * * *